F. LEADBEATER.
TROLLEY WHEEL.
APPLICATION FILED FEB. 11, 1915.
1,162,175.
Patented Nov. 30, 1915.
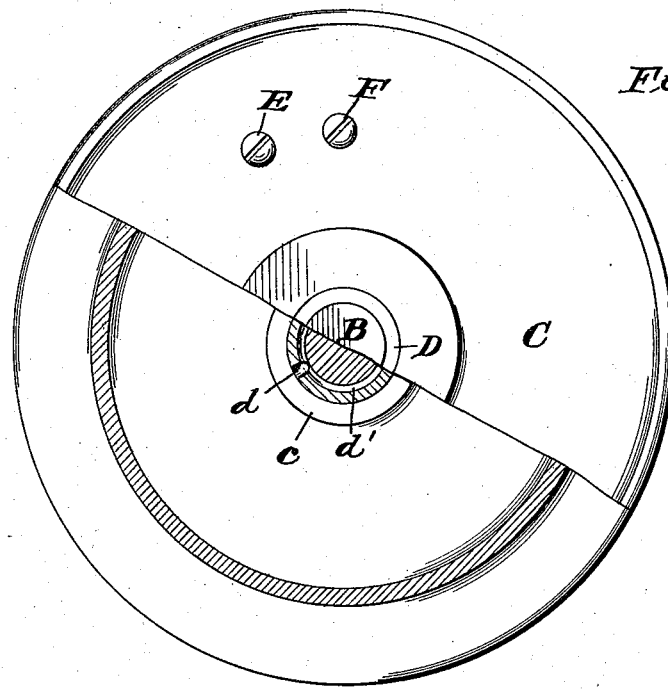
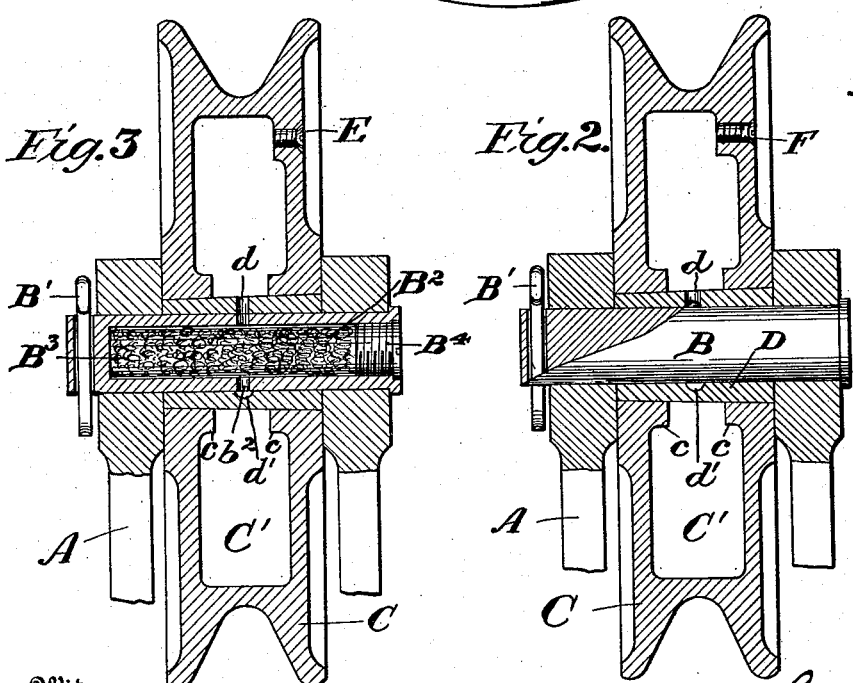
Witnesses
H. W. Thayer.
Lena Weigand
Inventor
Frederick Leadbeater
By
J. E. Thomas
Attorney
COLUMBIA PLANOGRAPH CO., WASHINGTON, D. C.

UNITED STATES PATENT OFFICE.

FREDERICK LEADBEATER, OF DETROIT, MICHIGAN.

TROLLEY-WHEEL.

1,162,175.     Specification of Letters Patent.     Patented Nov. 30, 1915.

Application filed February 11, 1915. Serial No. 7,482.

*To all whom it may concern:*

Be it known that I, FREDERICK LEADBEATER, citizen of the United States, residing at Detroit, county of Wayne, State of Michigan, have invented a certain new and useful Improvement in Trolley-Wheels, and declare the following to be a full, clear, and exact description of the same, such as will enable others skilled in the art to which it pertains to make and use the same, reference being had to the accompanying drawings, which form a part of this specification.

My invention relates to an improvement in trolley wheels shown in the accompanying drawings and more particularly pointed out in the following specification and claims.

While trolley wheels have been constructed with detachable rims bolted or otherwise engaged to a chambered body portion to receive a lubricant, it has been found that this construction is expensive and open to the objection that the rim and body portion soon become separated, largely due to the high speed at which the wheel is run.

One of the objects therefore of my invention is to provide a trolley wheel having a chambered body portion integral with the rim but fitted with a removable hub or bushing which may be replaced when worn, the hub being engaged with the body of the trolley wheel in any suitable manner, preferably through shrinking the latter upon the hub or bushing. So also the tines of the supporting harp are adapted to closely embrace the side walls of the wheel in order to maintain the hub in position against lateral displacement.

Another object of the invention is to provide in connection with the filler opening, an air vent having a closure plug formed with a central and a connecting transverse channel, whereby it is only necessary to partially unscrew the closure plug in order to provide an air vent into the oil chamber, thereby avoiding the chance of the closure plug being displaced or lost when filling the oil chamber of the trolley wheel with a lubricant.

Other advantages and improvements will hereafter appear.

In the drawings accompanying this specification: Figure 1, is a side elevation partly in section. Fig. 2, is a cross sectional view through the same showing a fragmentary portion of the supporting harp. Fig. 3, is a similar view of a modification of the supporting pin or shaft, the latter being of tubular construction to receive cotton waste or other like material adapted to be charged with a lubricant. Fig. 4, is a detailed sectional view of the air vent closure plug.

Referring now to the letters of reference placed upon the drawings: A, denotes a trolley supporting harp. B, a shaft carried by the tines of the harp having at one end a relatively large head, the other end being provided with a transverse opening to receive a cotter pin B′, to secure the shaft in place.

C, indicates a trolley wheel, the side walls of which are parallel and spaced apart to form a relatively large oil chamber C′.

c, c, are annular bosses formed on the inner face of the walls of the chambered portion to provide a relatively large engaging surface for the hub or bushing D;—the bosses being spaced apart that oil may be delivered to the aperture d, provided in the hub.

d′, is an annular groove formed in the inner face of the bushing and connected with the aperture d, that the oil may be distributed between the bushing and the shaft B.

E, designates a closure plug fitted in an opening in the side wall of the chambered portion of the trolley wheel through which the chamber may be filled with a suitable lubricant.

F, is a closure plug also fitted in the wall of the chambered portion having a central and connecting transverse channel f, whereby upon unscrewing the plug sufficiently to expose its transverse opening, an air vent may be established into the oil chamber without removing the plug.

In the modification shown in Fig. 3 the shaft B², is of tubular construction and provided with radial openings b², adapted to register with the openings d, in the bushing. B³, indicates a filling of cotton waste, or other like material, adapted to be charged with a lubricant. B⁴, is a closure plug fitted in the open end of the shaft.

Having indicated the several parts by reference letters the construction and operation of the device will be readily understood.

While the removable hub is shown tapering in the drawing, it may be of uniform diameter throughout its length, and the wheel may be either shrunk or otherwise engaged upon the hub. It will be obvious that the tines of the harp, which closely embrace the side walls of the trolley wheel, will themselves serve to secure the bushing or hub against lateral displacement.

Having thus described my invention what I claim is:—

1. In a device of the character described, a trolley wheel having a chambered body and a flange portion integral therewith, the walls of the body portion being substantially parallel and spaced apart to provide a relatively large chamber to receive a lubricant and with openings in the walls through which the lubricant may be introduced and the chamber vented, an annular bushing engaged with the body portion having radial openings through which oil may pass from the chambered body portion to the inner surface of the bushing, closure plugs for said openings in the walls of the chamber, one of said closure plugs having a central and connecting transverse passage opening into the oil chamber, whereby upon adjusting said plug an air vent may be provided into the oil chamber without entirely removing the plug, a suitable supporting harp, and a transverse shaft carried by the tines of said harp upon which the trolley wheel is mounted.

2. In a device of the character described, a trolley wheel comprising a chambered body portion having a flange portion integral with the body portion, the side walls of the chambered body portion being parallel and spaced apart to provide a relatively large oil chamber, an annular bushing fitted into the walls of said chambered portion having radial openings for the passage of oil, a tubular shaft carried by a harp adapted to receive a fibrous oil supporting wick, said shaft having radial openings for the passage of oil registering with the radial openings of the bushing, and the supporting harp having tines adapted to embrace the side walls of the trolley, whereby the bushing may be secured against lateral displacement.

In testimony whereof, I sign this specification in the presence of two witnesses.

FREDERICK LEADBEATER.

Witnesses:
SAMUEL E. THOMAS,
LENA WEIGAND.